(12) United States Patent
Rydnell et al.

(10) Patent No.: US 8,626,235 B2
(45) Date of Patent: *Jan. 7, 2014

(54) 3G/GSM AND WLAN INTEGRATION OF TELEPHONY

(75) Inventors: Gunnar Rydnell, Vastra Frolunda (SE); Hans Bertil Ronneke, Kungsbacka (SE); Stefan Rommer, Vastra Frolunda (SE); Jan Lindskog, Pixbo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,949

(22) Filed: Jul. 5, 2012

(65) Prior Publication Data

US 2012/0270541 A1    Oct. 25, 2012

Related U.S. Application Data

(63) Continuation of application No. 13/036,293, filed on Feb. 28, 2011, now Pat. No. 8,238,919, which is a continuation of application No. 11/575,183, filed as application No. PCT/SE2004/001346 on Sep. 17, 2004, now Pat. No. 7,937,085.

(51) Int. Cl.
  *H04M 1/00* (2006.01)
(52) U.S. Cl.
  USPC ...................................................... 455/552.1
(58) Field of Classification Search
  USPC ...................................................... 455/552.1
  See application file for complete search history.

(56) References Cited

U.S. PATENT DOCUMENTS

| 6,119,003 | A | 9/2000 | Kukkohovi | |
|---|---|---|---|---|
| 7,768,977 | B2 * | 8/2010 | Camp, Jr. | 370/332 |
| 7,937,085 | B2 * | 5/2011 | Rydnell et al. | 455/437 |
| 2002/0147008 | A1 * | 10/2002 | Kallio | 455/426 |
| 2004/0105434 | A1 * | 6/2004 | Baw | 370/355 |
| 2004/0203788 | A1 * | 10/2004 | Fors et al. | 455/439 |
| 2005/0186906 | A1 | 8/2005 | Hussmann | |

FOREIGN PATENT DOCUMENTS

GB    2336066 A    10/1999

OTHER PUBLICATIONS

Salkintzis, AK; "Interworking Between WLANs and Third-Generation Cellular Data Networks"; Vehicular Technology Conf, 2003, The 57'h IEEE Semiannual. vol. 3. Apr. 22-25, 2003.

* cited by examiner

*Primary Examiner* — Marisol Figueroa

(57) ABSTRACT

Embodiments of the present invention include a method and system for operating a dual mode terminal that includes a wireless local area network interface and a cellular radio interface. According to an embodiment, the dual mode terminal camps on the cellular radio interface when idle. When a Page Request message is received over the cellular radio interface, the terminal determines whether wireless local area network coverage is possible from an access point providing wireless local area network cellular communication. If so, the terminal processes the incoming communication request over the wireless local area network towards another party, wherein then the communication is ended, the terminal goes back to camp on the cellular channel.

11 Claims, 6 Drawing Sheets

3G/GSM AND WLAN INTEGRATION OF TELEPHONY

This application is a continuation of U.S. application Ser. No. 13/036,293, filed Feb. 28, 2011, which was a continuation of U.S. application Ser. No. 11/575,183, which was the National Stage of International Application No. PCT/SE04/01346, filed Sep. 17, 2004, the disclosures of which are incorporated herein by reference.

FIELD OF THE INVENTION

The present invention relates to dual mode systems and nodes. In particular, the present invention relates to the area of WLAN—mobile telephony integration of voice services.

BACKGROUND OF THE INVENTION

The current GSM/3G and WLAN technologies constitute two separate radio network technologies. They operate at different frequencies and make use of separate designated protocols. Currently standardization work is ongoing on integrating data and other services of WLAN and GSM/3G in the forums of 3GPP, 3GPP2 and IEEE.

Six scenarios dealing with various degrees of integration have been sketched in the third generation partnership project, 3GPP. Scenarios 1, 2 and 3 have been defined so far. However, the work for scenario 6, i.e. WLAN GSM/3G integration of telephony (Circuit Switched voice services) has not yet started.

A desirable concept known as "always best connected" aims to ensure that the best and cheapest service connection is rendered available to the user at all times and performing handover in such a way that the user hardly notices the underlying access technology.

Currently, dual mode mobile phones integrating different kinds of radio access techniques, such as WLAN and GSM/3G, providing prior art access on the choice of the user by means of one apparatus have been rendered available on the marketplace. However, Cellular systems and WLAN systems are currently not interoperable on the network side. If a telephone call is received for a subscriber in GSM/3G, it is not possible to handover the call to a WLAN system, even if the subscriber is in reach of WLAN coverage and is in possession of a dual mode mobile or vice versa. One problem is that there is no integration of WLAN and GSM/3G network nodes or corresponding signaling protocols.

A further problem for the integration of WLAN and GSM/3G services is the pico-cell character of the WLAN radio network. The WLAN radio network consists of a flat structure of pico-cells, not at all suitable for typical mobile user behavior. A telephony call would be difficult to maintain in a WLAN network when a user moves with high speed as he is used to in a cellular network.

SUMMARY OF THE INVENTION

It is a first object to set forth a method for integration of telephony between WLAN and GSM/3G A signaling method for incoming voice calls in GSM/3G and handing over to WLAN has been provided.

A signaling method for outgoing voice calls in GSM/3G or in WLAN has moreover been provided.

It is a first object of the invention to provide a dual mode GSM/3G and WLAN capable mobile terminal.

This object has been accomplished by the subject matter defined in claim 1.

It is another object to provide a WLAN-GSM/3G Interworking Node, IWF.

This object has been accomplished by the subject matter defined in claim 3.

It is still another object to provide a selection mechanism for dual mode GSM/3G and WLAN mobile for enabling and disabling WLAN.

This object has been accomplished by claim 8.

A signaling method for handing over a voice call from WLAN back to GSM/3G has been provided according to claim 11.

A camping mechanism for dual mode GSM/3G and WLAN mobile terminal is provided, such that the dual mode mobile terminal can be paged for incoming telephone calls.

Further advantages will appear from the following detailed description of the invention.

DETAILED DESCRIPTION OF PREFERRED EMBODIMENTS OF THE INVENTION

The present invention proposes a method for integrating the telephony service of WLAN and GSM/3G.

Figure 1:
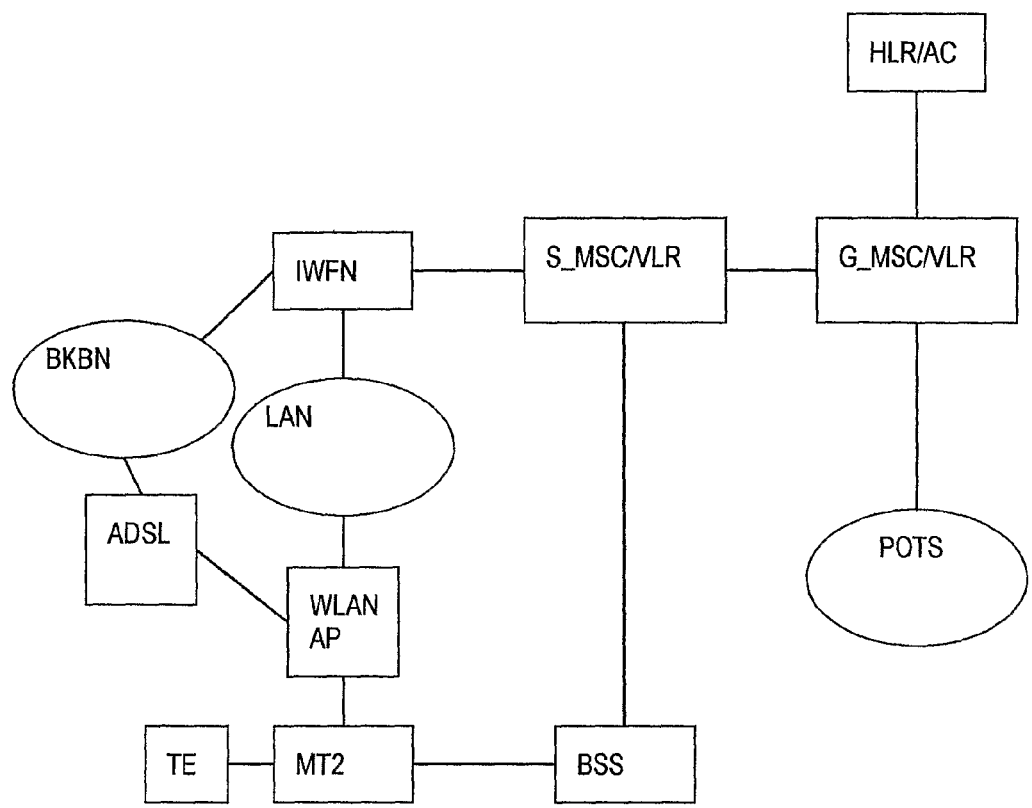
FIG. 1 shows a first preferred embodiment of a system architecture according the invention comprising an Inter-Working Forwarding Node (IWFN)

The integrated architecture according to a first embodiment of the invention is shown in FIG. 1. A GSM/3G network is shown, comprising prior art elements: base station set, BSS, Serving Mobile Node, also denoted Mobile Switching Center/Visiting Location Register, S_MSC/VLR, (also partly referred to as Serving GPRS Support Node), G_MSC/VLR, Gateway Node Mobile Switching Centre/Visiting Location Register, S_MSC/VLR, (also partly referred to as Gateway GPRS Support Node), home location register, HLR/AC, the plain old telephony system, POTS, dual mode mobile terminal, a packet data gateway, PDG. Moreover, a standard wireless local area network access point, WLAN AP, is provided.

The WLAN AP node may be coupled to the interworking and forwarding node IWFN either through an appropriate network such as an Ethernet LAN or via another network such as an ADSL modem and suitable backbone network, BKBN.

Figure 2:
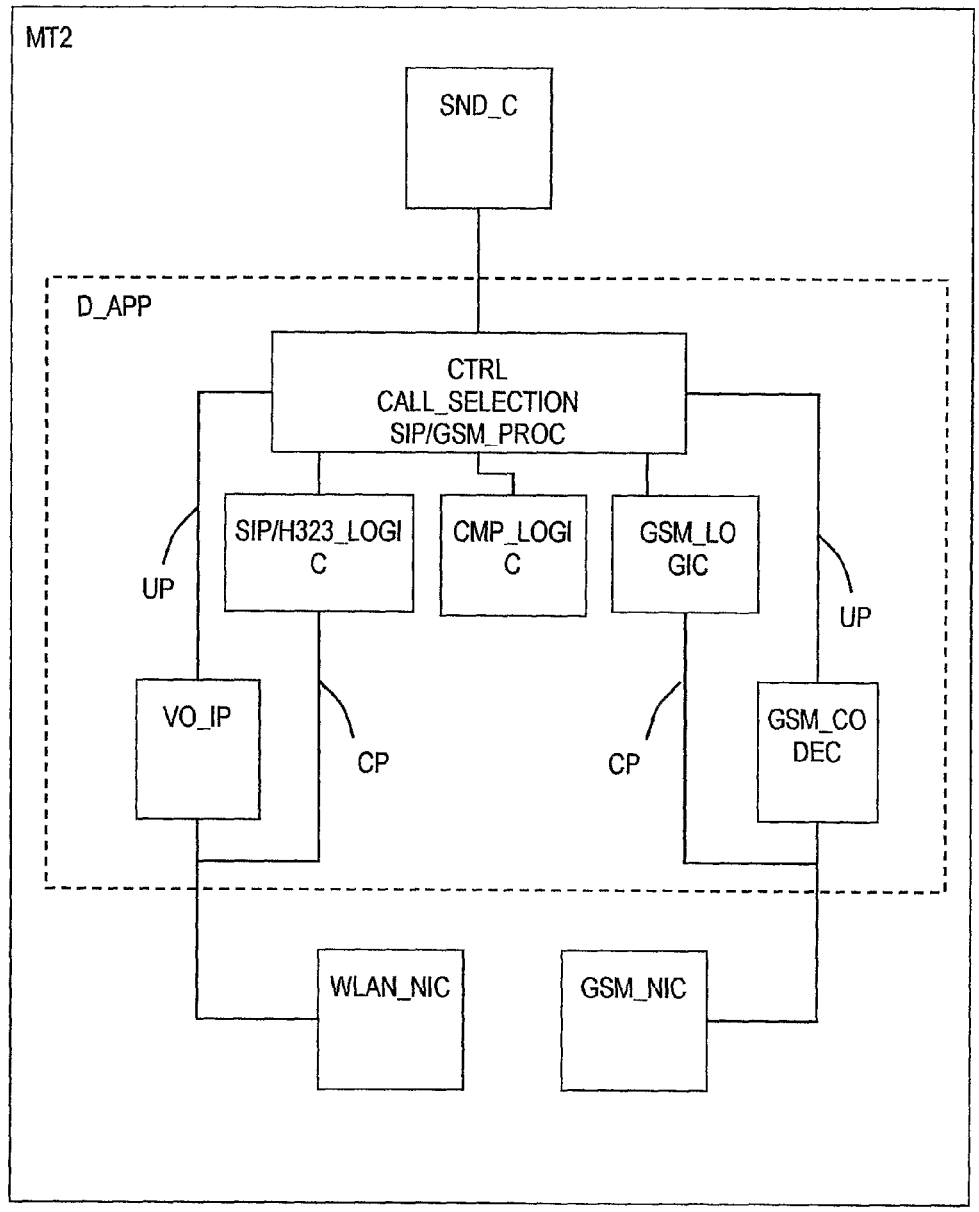
FIG. 2 shows a schematic representation of a dual mode terminal according to the invention having both GMS and WLAN capabilities and corresponding network interface cards.

In FIG. 2, a logic diagram pertaining to the dual mode WLAN-GSM/3G mobile, MT2, according to a preferred embodiment of the present invention is shown. The dual mode terminal comprises two radio network interfaces—one for GSM/3G transmission/reception, GSM_NIC, and one for WLAN transmission/reception, WLAN_NIC, whereby both interfaces may be in operation simultaneously. The dual mode mobile terminal moreover comprises a conventional sound card, SND_C, offering connections to loudspeaker/amplifier and microphone.

The dual mode terminal may consist of a standard processing platform, such as a laptop or personal digital assistant (PDA), controlled by a usual common operating system. The network interface cards may be off-the-shelf components, while the functionality of the call selection processor and the various logic functions may be performed by a software application running on the standard processing platform, such as a common laptop computer or PDA.

According to a preferred embodiment of the invention, the dual mode platform comprises a software application, D_APP, which comprises the following logic functions: apparatus control and call selection, CTRL_CALL_SELECTION, SIP/H323 logic and signal processing, SIP/H323_LOGIC, voice over IP coding/decoding, VO_IP, GSM logic and signal processing, GSM_LOGIC and GSM voice coding/decoding, GSM_CODEC. Finally there is provided a camp logic function, CMP_LOGIC, for controlling whether the dual mode mobile terminal shall operate over the GSM or WLAN network interface cards. In the following, a preferred embodiment for the handshaking between the dual mode mobile terminal and the exterior (cf. FIGS. 4 and 5) is illustrated using SIP protocol signaling. As an alternative, the H323 protocol may be used.

For the WLAN network interface card, signal streams are communicated over a user plane, UP, bearing voice over IP packets and a H323/SIP control plane, CP. For the GSM network interface card signals are transmitted over GSM-codec, UP, and GSM control signaling plane, CP. In a manner, which shall be disclosed in the following, voice signals may selectively be transferred between the sound card, SND_C, and the WLAN network interface card, WLAN_NIC or the GSM network interface card, GSM_NIC.

The control plane signaling issued on the respective interface cards shall be explained later with reference to FIGS. 4 and 5. It should be noticed that, the principles of the present invention also applies to a 3G/WLAN equipped dual mode terminal although the exemplary embodiment has been shown for GSM/WLAN dual mode terminal. It should be further noticed that the term dual mode terminal does not exclude more than two access technologies being provided in the terminal.

According to the invention a WLAN-GSM/3G Interworking Node, IWFN, has been provided between the WLAN AP and the S_MSC/VLR. The IWF is responsible for "translating" a voice call between GSM voice and IP telephony, that is, translate the GSM audio codec format to voice over IP audio codec and performing signaling for enabling the call to be made via standard nodes.

Figure 3:
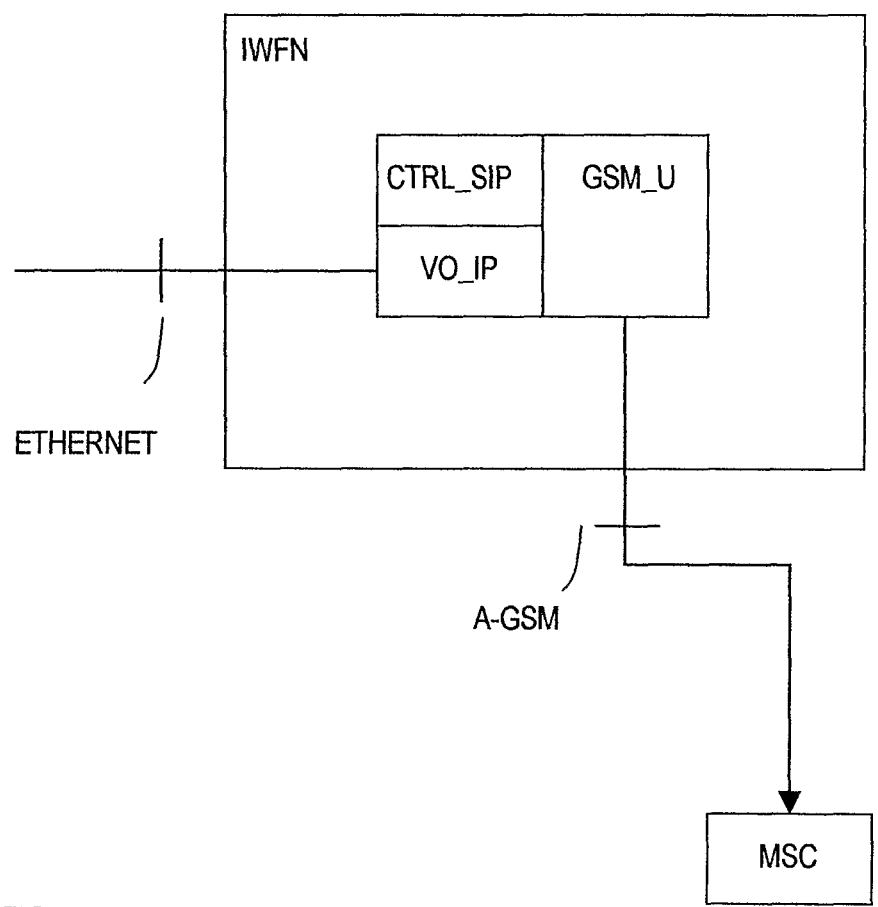
FIG. 3 shows an Interworking Forwarding Node according to the invention.

In FIG. 3, a preferred embodiment of the IWFN has been shown. It comprises an A-GSM interface for connection to a mobile switching center, MSC, and an Ethernet interface for coupling to a WLAN access point AP. It moreover comprises an GSM codec coder and decoding unit, GSM_U, as well as a voice over IP coding and decoding unit, VO_IP, for translating a GSM codec stream into voice over IP stream and vice versa. Moreover, the unit comprises a SIP signaling protocol control unit, CTRL_SIP, for transmitting for signaling to a GSM interface card. It moreover contains a H.323 service. The functionality of the IWFN shall be dealt with in more detail later.

As mentioned above, the WLAN AP node may be coupled to the interworking and forwarding node IWFN either through an appropriate network such as an Ethernet LAN or via another network such as an ADSL modem and suitable backbone network, BKBN.

According to the invention, The Serving MSC is configured such that it can hand over a voice call from the Base station to the new IWF node. However, the IWF node preferably "appears like" an ordinary base station system, BSS, to the MSC and normal HO is done between WLAN and GSM/3G from the MSC point of view.

Advantageously, the dual mode mobile terminal MT2 may identify the IWF node by an IP address that is preconfigured in the dual mode mobile terminal, MT2.

According to the invention an exemplary system is envisaged where many AP are provided in different locations so as to provide so-called "hot-spot" access to prescription users. The system according to the invention may moreover comprise predetermined "home AP's" provided in home and office environments. Common for these AP's are that they are coupled to the interworking node, IWF, according to the invention, alternatively, that there are provided several interworking nodes to which respective the AP's are coupled.

A preferred embodiment of the invention shall now be explained with reference to FIGS. 4 and 5.

Figure 4:
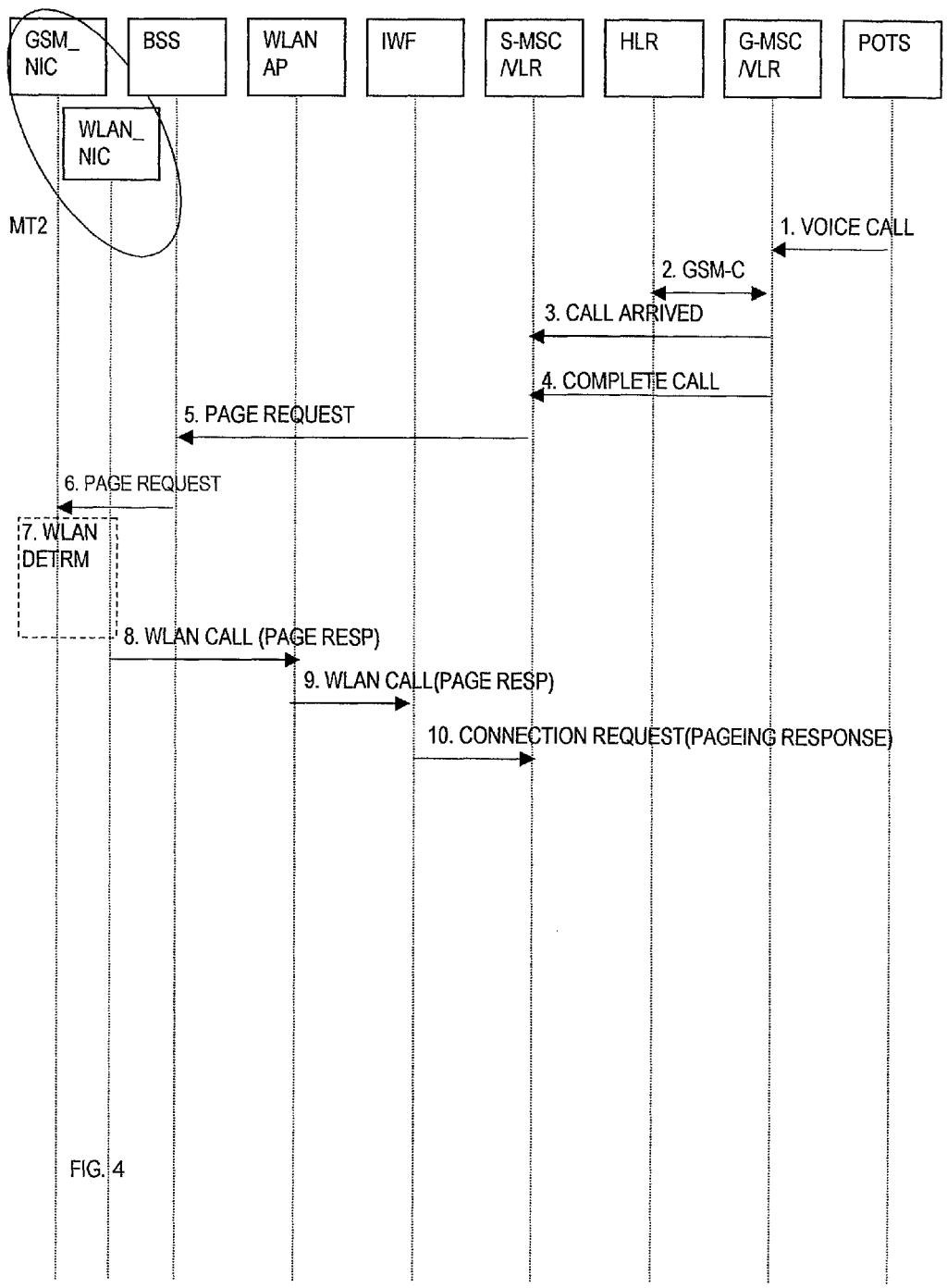
FIGS. 4 and 5 shows, among other, a handshaking diagram for a telephone call originating from a mobile telephone system being acknowledged via the GSM network interface card of a dual mode terminal and subsequently being handed over to the WLAN network interface card.
Figure 5:
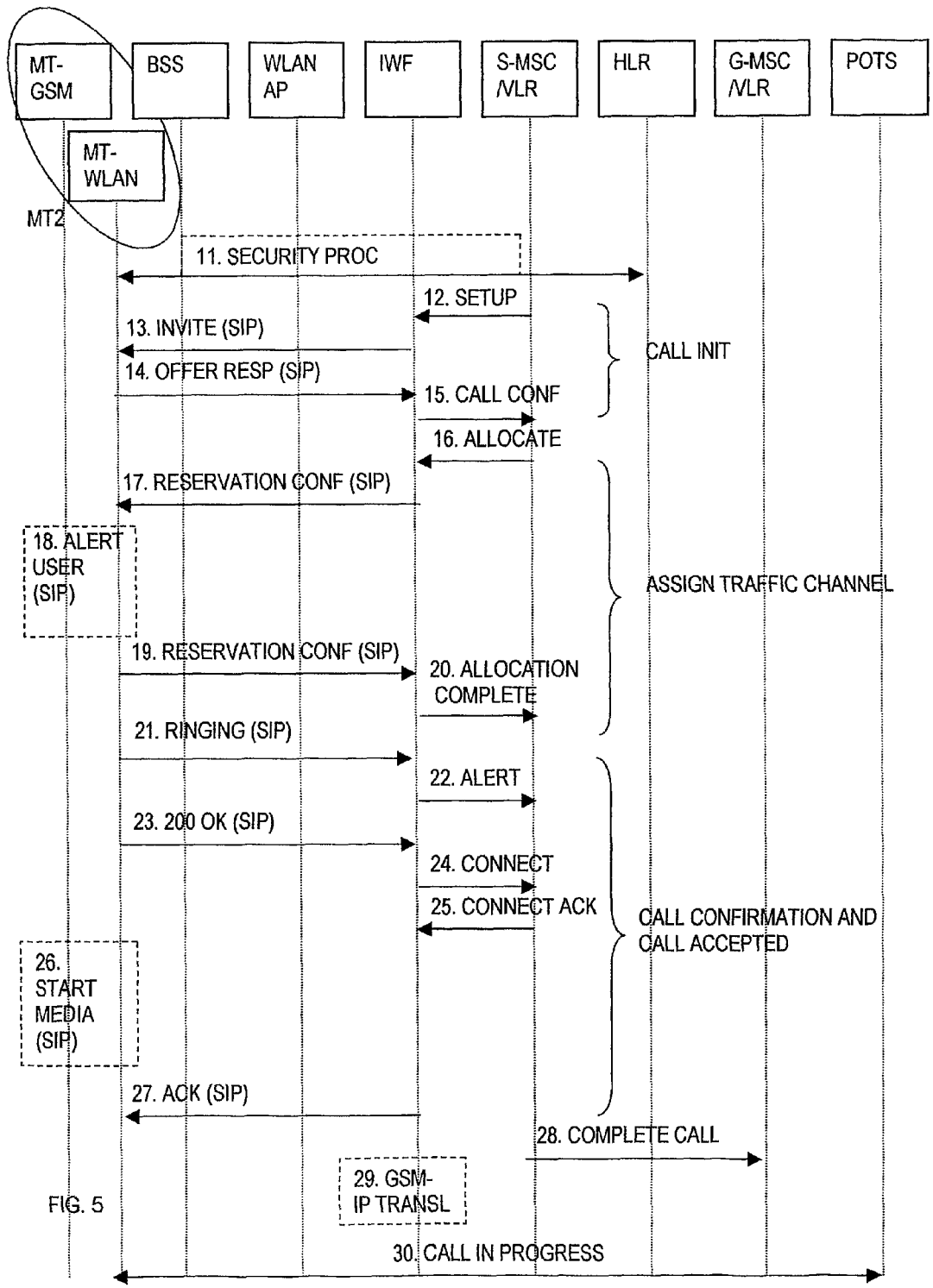

I.—Signaling Method for Incoming Voice Calls From the GSM/3G System and Hand-over to the WLAN Radio Interface of a Dual Mode Terminal FIGS. 4 and 5 shows the signaling sequence according to the invention where a voice call is received in the cellular network and handed over to the WLAN network interface card of the dual mode terminal.

In the present embodiment the dual mode terminal is active and is attached to both the GSM network as well as a WLAN network. It should be understood that the network provider both supports both the GSM facilities as well as the WLAN facilities to the dual user subscriber.

1. An Incoming Voice Call to Gateway G-MSC (GSM Mobile Switching Center) /VLR is detected
2. the G-MSC initiates a HLR Location Request to find the S-MSC to which the addressed terminal is attached, the HLR responds
3. the G-MSC signals a Call Arrived message to the S-MSC
4. a Complete Call instruction is sent from the G-MSC to the S-MSC, the voice Call forwarded to S-MSC
5. a Page Request is sent from the S-MSC to BaseStation (BSS)
6. the Page Request is forwarded to the dual mode mobile terminal on the Air Interface
7. the dual mode mobile terminal performs a determination as to whether WLAN access is possible from an AP providing WLAN telephony calls, and if so, decides to proceed further over the WLAN radio interface (by the mechanism proposed below in connection with FIG. 6)
8. a Page Response is sent from MT2 to WLAN AP (the IWF is addressed an IP address pre-configured by the dual mode mobile terminal)
9.—which is forwarded to the IWFN,
10.—and further to the S-MSC
11. security functions are carried out in order to authenticate the MT
12. setup; initiate call setup
13. Invite (SIP); Initiate call setup (translated to SIP)
14. Offer Response (SIP); Initiation confirmed (translated to SIP)
15. Call Conference (SIP); Initiation confirmed
16. Allocate; Request reservation of resources for call
17. Reservation (SIP); request reservation of resources for call (translated to SIP)

18. Alert User (SIP); terminal is prepared for call reception
19. Reservation Conference; resource reservation confirmed (translated to SIP)
20. Allocation Complete; resource reservation confirmed
21. Ringing (SIP); ring tone generated at B-party (translated to SIP)
22. Alert; ring tone generated at B-party
23. 200 OK (SIP); answer indication i.e. B-party answers (translated to SIP)
24. Connect; answer indication i.e. B-party answers
25. Connect Acknowledge; when answer indication is received an acknowledge is sent to terminal
26. Start Media (SIP); when terminal has sent the answer indication (200 OK) it starts to send the media stream i.e. VoIP payload
27. Acknowledge (SIP); when answer indication is received an acknowledge is sent to terminal (translated to SIP)
28. Complete Call; serving MSC acknowledges back to gateway MSC that call has been established
29. GSM/IP translation 29; the IWF does any necessary coding/decoding or other translation between VoIP payload and GSM coded payload
30. call in progress The SIP signals comparative to the SIP protocol have been indicated in brackets above.

It is seen that in relation to a prior art GSM call, the voice call according to the invention is routed to the IWF instead of to the Base station (BSS) in the Serving MSC.

II.—Signaling Method for Making Outgoing Voice Calls From a WLAN Radio Interface to a GSM/3G System A method is also set forth involving a user of the dual mode terminal initiating a phone call. This procedure shall also be explained with respect to FIGS. 4 and 5, using the following steps:
—. The user of the dual mode terminal, MT2,wants to make an outgoing telephone call
7. The dual mode mobile terminal decides to make the call over the WLAN network interface card (by the mechanism proposed below as explained in connection with FIG. 6)
8.—30 A voice call setup signal is sent via WLAN AP- IWF- to S-MSC (the IWF is addressed by a MT preconfigured IP address) as explained according to steps 8-30 above The voice call is handled as usual in the GSM/3G network and is setup towards the fixed end user. The call is made and when completed the dual mode mobile terminal goes back to camp on the GSM/3G channel.

III.—Signaling Method for Handing Over a Voice Call From the WLAN Radio Interface to the GSM/3G Interface of the Dual Mode Terminal If during a voice call in WLAN radio access, the dual mode mobile terminal moves out of reach for the WLAN AP, a handover to GSM/3G is triggered. The action taken in the dual mode mobile terminal is as follows:
1. Radio contact with the WLAN AP is lost
2. Scan for a GSM/3G cell.
3. Attach to the GSM/3G cell
4. Send a location update to the MSC to indicate that an Infra RAT HO (handover) shall take place
5. The MSC will forward the voice call to the new GSM/3G cell
6. The call will continue in the new GSM/3G cell Obviously, this method will cause a slight interrupt in the service when doing the hand-over. A more sophisticated method is envisaged based on searching for alternative radio access coverage during the call, in a manner similar GSM searching or compressed mode in 3G.

IV.—Camping Method for Dual Mode Mobile Terminals, Allowing Paging of Dual Mode Mobile Terminals for Incoming Telephone Calls According to a preferred embodiment, when idle, the dual mode terminal will preferably camp on the GSM/3G radio network for simplicity. In that case the mobility management and paging mechanism in GSM/3G is reused. Only when a voice call is started, the dual mode mobile terminal may go over to WLAN radio access. And when the call is ended, the dual mode mobile terminal will go back to GSM/3G and make a Location update. This will ensure that the dual mode mobile terminal is always reachable, even when moving at high speed.

V.—A Selection Mechanism for Enabling and Disabling WLAN Service in a Mobile Dual Mode Terminal According to the Invention.

In view of the pico-cell nature of the WLAN, a selection mechanism for enabling WLAN access is defined, which seeks to accomplish that only when the dual mode mobile terminal, MT2, is stationary or moving at a very low speed, WLAN access is preferred. The GSM interface card on the other hand is preferably turned on at all times.

Figure 6:
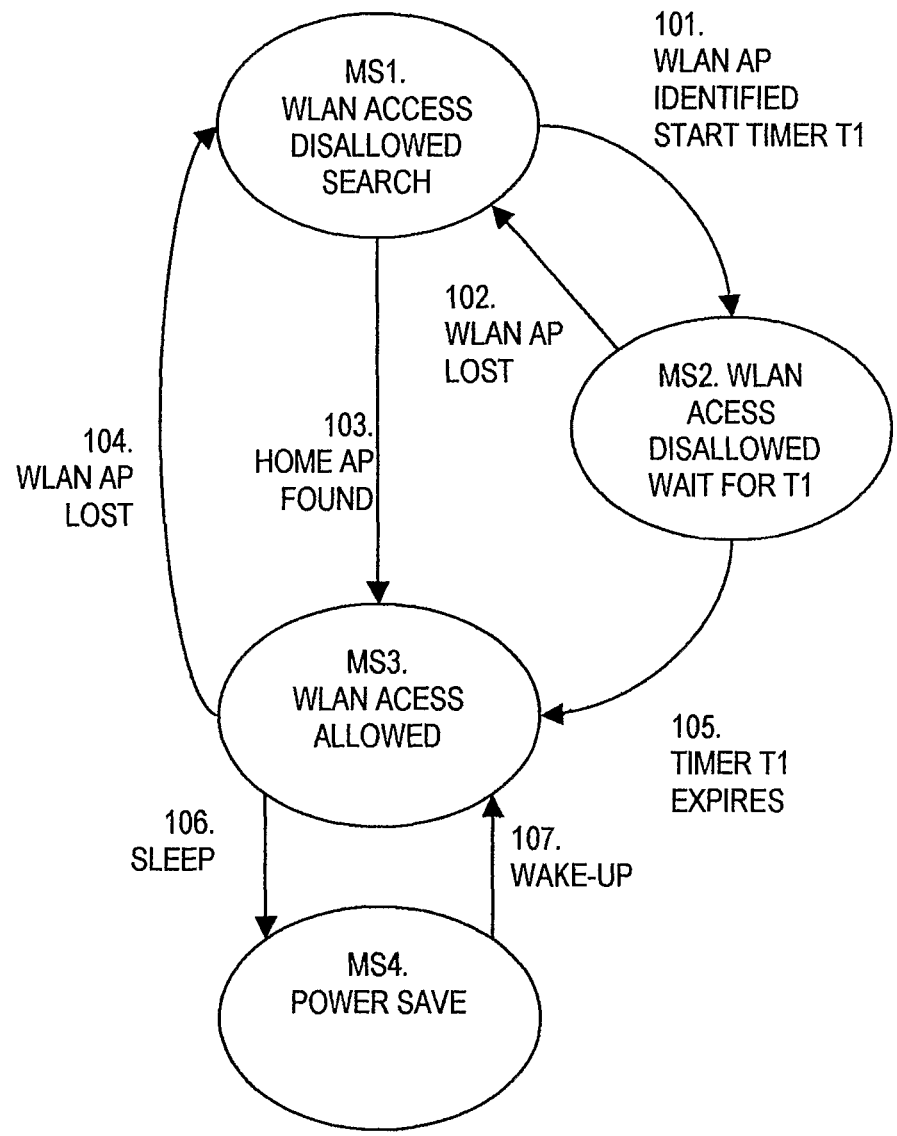
FIG. 6 shows a state diagram for the dual mode terminal according to the invention.

This mechanism may work as exemplified by the states of the dual mode mobile terminal MS1, MS2 and MS3 and the corresponding change state conditions that are shown in FIG. 6. There is moreover provided an optional power save mode MS4, in view of the relatively high power consumption of current WLAN network interface cards. The selection mechanism may be implemented in the application, D-APP, in the logic function camping logic, CMP_LOGIC, shown in FIG. 2.

The mobile terminal initially adopts a WLAN access disallowed state, MS1, searching for WLAN AP's, 101. If a WLAN AP is identified offering access, state MS2 is adopted. One way of determining whether the found AP is offering connection to an IWF is that the terminal tries to communicate with the IWF, sending a WLAN Call message (cf. FIG. 4 step 8—WLAN Call (Page Response)) and await an Invite, (cf. FIG. 4, step 13, Invite) or some other message, such as Pinging the IWF.

In state MS2 a timer value T1 is defined such that, if the dual mode mobile terminal has heard the same WLAN AP for a time longer than given by the timer, MS2—"WLAN access disallowed wait for T1", then the dual mode mobile terminal is set in a state, MS3, allowing voice calls to be handed over to WLAN, "WLAN access allowed", since the dual mode mobile terminal is probably not moving. If the signal is lost the mobile terminal goes back to MS1, 102. When, in MS3, the dual mode mobile terminal cannot hear the WLAN AP anymore—104, WLAN lost—the dual mode mobile terminal is set to state "WLAN access disallowed", MS1. WLAN access may also be allowed when one of a set of pre-defined AP's, such as a "home AP" is found, 103. In other instances, when the AP is lost, the WLAN access disallowed state MS1 is chosen.

In MS3 the WLAN interface card is powered on and will remain so if the WLAN card is used for transmission or access to the WLAN AP is not lost. However, if no transmission takes place while the AP is being present, the dual mode mobile terminal may enter a power save mode switching off the WLAN network interface card, WLAN_NIC.

According to a further embodiment, the user may also actively select or overrule WLAN access by giving a command to the dual mode mobile terminal that WLAN access is preferred. This selection can be based on a presentation of available radio access networks as sensed by the dual mode mobile terminals, e.g. WLAN AP's that are within reach.

As mentioned above, when a particular predefined AP is discovered ("home AP"), 103, WLAN access may be selected, MS3, without any timer being set. WLAN is installed in many homes today, and a given Home AP may be set as preferred access. Alternatively, a typical preferred AP may be the WLAN in the office, hence more than one predefined "home AP" may be provided.

In any case, when the selection mechanism enters the state "WLAN Access Allowed", MS3, the behavior of the dual mode mobile terminal can be such that the dual mode mobile terminal by itself always access through the WLAN or alternatively it can be indicated to the user that this state has been entered, so that the user can chose to do access by WLAN. Preferable, the actual state is notified to the user when the state is entered or left or when an automatic transition between the WLAN system and the GSM/3G system occurs. This notification can be a noise signal, a light signal, a buzz signal, a message or an icon on the display or any other type of signal.

The above mechanism secures that if the user of the dual mode terminal is on the move and is passing through a given area in which WLAN access is available, the readiness for responding, making and keeping GSM/3g phone calls, including during GSM/3G handover, is prioritised and secured. On the other hand, if the user is within a "stationary" reach of a "home AP", calls are enabled over the WLAN interface.

If the user remains within coverage of the predetermined home AP, but is not using the dual mode mobile terminal actively, the dual mode terminal may enter a power save mode in which the WLAN network interface card is set to sleep after a suitable period of inactivity, 106. If activity is again encountered involving attempting to use the WLAN network interface or an activity on the GSM interface is encountered, a wake-up request 107, places the terminal back in the WLAN access allowed state, MS4. In this instance the user may or may not have moved out of WLAN coverage, in the former case, the dual mode mobile terminal entering state MS1.

The invention claimed is:

1. A method of operating a dual mode terminal comprising a wireless local area network interface and a cellular radio interface, comprising the steps of:
    camping on the cellular radio interface when idle;
    when receiving a Page Request message over the cellular radio interface indicating an incoming communication request over the cellular radio interface, performing a determination as to whether wireless local area network coverage is possible from an access point providing wireless local area network cellular communication and, if so:
        responding, by issuing a wireless local area network communication message to the wireless local area network access point thus determined over the wireless local area network interface to an interworking node;
        subsequently engaging in a communication initiation procedure, an assign traffic channel procedure and a communication confirmation and communication accepted procedure with the interworking node; and,
        processing the incoming communication request over the wireless local area network interface towards another party, wherein when the communication is ended, the dual mode terminal going back to camp on the cellular channel.

2. The method according to claim 1, wherein the communication initiation procedure comprises the steps of:
    the interworking node issuing an Invite signal to the dual mode terminal upon receiving a setup from the mobile serving node; and,
    issuing a communication confirm signal upon receiving an offer response signal from the dual mode terminal.

3. The method according to claim 1, wherein the assign traffic channel procedure comprises the steps of:
    the interworking node issuing a reservation confirm signal to the dual mode terminal upon receiving an allocate signal from the mobile serving node; and,
    issuing an allocation complete signal upon receiving a reservation confirm signal from the mobile serving node.

4. The method according to claim 1, wherein the communication confirmation and communication accepted procedure comprises the steps of:
    the interworking node issuing alert and connect signals to the mobile serving node upon receiving ringing and 200-OK signals from the dual mode terminal; and,
    the interworking node issuing an acknowledgement signal to the dual mode terminal upon receiving a connection acknowledged signal from the mobile serving node.

5. The method according to claim 1, wherein when selecting to receive or transmit cellular communication over the cellular interface or over the wireless local area network interface, the dual mode terminal further performs the steps of:
    initially adopting a state in which cellular communication over wireless local area network access is disallowed, searching for a wireless local area network access point offering connection to cellular communication;
    starting a timer when identifying a predetermined wireless cal area network access point offering connection to cellular communication; and,
    upon the timer expiring, allowing cellular communication to be performed over the predetermined wireless local area network access point.

6. The method according to claim 5, wherein when entering a wireless local area network access allowed state, but the user has not used the wireless local area network access for a given period, entering a power save mode in which wireless local area network access is not allowed.

7. The method according to claim 6, wherein, if in the power save mode, entering the wireless local area network allowed state upon obtaining a page request signal or if necessitated by the user actively seeking to use the wireless local area network interface or wishing to perform cellular communication.

8. A dual mode terminal, comprising:
    a wireless local area network interface and a cellular radio interface;
    a software application including apparatus control and call selection, SIP/H323-logic and signal processing, voice over IP coding/decoding, GSM-logic and signal processing and cellular voice coding/decoding, and a camp logic function for controlling whether the dual mode mobile terminal shall operate over the cellular or the wireless local area network interfaces;
    wherein said dual mode terminal is operative to:
        camp on the cellular radio interface when idle;
        when receiving a Page Request message over the cellular radio interface indicating an incoming communication request over the cellular radio interface, perform a determination as to whether wireless local area network coverage is possible from an access point providing wireless local area network telephony calls and, if so:

responding by issuing a wireless local area network communication message to the wireless local area network access point thus determined over the wireless local area network interface to an interworking node;

subsequently engaging in a communication initiation procedure, an assign traffic channel procedure and a communication confirmation and communication accepted procedure with the interworking node; and, processing the incoming communication over the wireless local area network interface towards another party, wherein the dual mode terminal goes back to camp on the cellular channel, when the call is ended.

9. The dual use terminal according to claim 8, wherein said terminal, when selecting to receive or perform cellular communication over the cellular interface or over the wireless local area network interface, is further operative to:

initially adopt a state in which cellular communication over wireless local area network access is disallowed and search for a wireless local area network access point offering cellular communication;

start a timer when identifying a predetermined wireless local area network access point offering cellular communication; and, upon the timer expiring, allow cellular communication to be performed over the predetermined wireless local area network access point.

10. The dual use terminal according to claim 9, wherein said terminal is further operative, when entering a wireless local area network access allowed state, but the user has not used the wireless local area network access for a given period, to enter a power save mode in which wireless local area network access is not allowed.

11. The dual use terminal according to claim 10, wherein said terminal is further operative, if in the power save mode, to enter the wireless local area network allowed state upon obtaining a page request signal or if necessitated by the user actively seeking to use the wireless local area network interface or wishing to make a phone call.

* * * * *

UNITED STATES PATENT AND TRADEMARK OFFICE
CERTIFICATE OF CORRECTION

PATENT NO. : 8,626,235 B2
APPLICATION NO. : 13/541949
DATED : January 7, 2014
INVENTOR(S) : Rydnell et al.

It is certified that error appears in the above-identified patent and that said Letters Patent is hereby corrected as shown below:

On the Title Page, Item (75), under "Inventors", in Column 1, Line 1, delete "Vastra Frolunda" and insert -- Västra Frölunda --, therefor.

On the Title Page, Item (75), under "Inventors", in Column 1, Line 2, delete "Ronneke," and insert -- Rönneke, --, therefor.

In the Specification

In Column 1, Line 67, delete "invention, and" and insert -- invention, --, therefor.

In Column 2, Line 1, delete "shows," and insert -- show, --, therefor.

In Column 4, Line 4, delete "invention, The Serving" and insert -- invention, the Serving --, therefor.

In Column 5, Line 61, delete "Infra" and insert -- Intra --, therefor.

In the Claims

In Column 8, Line 36, in Claim 5, delete "cal area" and insert -- local area --, therefor.

In Column 9, Line 20, in Claim 9, delete "use" and insert -- mode --, therefor.

In Column 10, Line 10, in Claim 10, delete "use" and insert -- mode --, therefor.

In Column 10, Line 16, in Claim 11, delete "use" and insert -- mode --, therefor.

Signed and Sealed this
Nineteenth Day of August, 2014

Michelle K. Lee
*Deputy Director of the United States Patent and Trademark Office*